United States Patent [19]

Furukawa

[11] 4,223,271

[45] Sep. 16, 1980

[54] INTEGRATING CIRCUIT

[75] Inventor: Masamichi Furukawa, Tokyo, Japan

[73] Assignee: Ricoh Company, Ltd., Tokyo, Japan

[21] Appl. No.: 909,110

[22] Filed: May 24, 1978

[30] Foreign Application Priority Data

May 31, 1977 [JP] Japan .................. 52-63707

[51] Int. Cl.² .......................... H03K 5/00; G06G 7/18
[52] U.S. Cl. ................................. 328/127; 328/128;
307/229; 330/110
[58] Field of Search ................. 328/127, 128; 333/19;
307/229; 330/109, 110, 294

[56] References Cited

U.S. PATENT DOCUMENTS

| 3,047,808 | 7/1962 | Gray | 328/127 |
|---|---|---|---|
| 3,225,949 | 8/1965 | Fjällbrant | 330/109 |
| 3,370,247 | 2/1968 | Hoffman et al. | 330/109 |
| 3,845,398 | 10/1974 | Katz | 328/128 |
| 3,904,978 | 9/1975 | Daniels et al. | 330/109 |
| 3,983,504 | 9/1976 | Moy | 330/109 |

Primary Examiner—Stanley D. Miller, Jr.
Assistant Examiner—B. P. Davis
Attorney, Agent, or Firm—David G. Alexander

[57] ABSTRACT

An integrating capacitor is connected between the inverting input and the output of an operational amplifier. A plurality of resistors are connected in series to the inverting input. A plurality of capacitors are connected between the inverting input and junctions of the resistors respectively. The time required for the output voltage of the operational amplifier to reach a predetermined level is an exponential function of a voltage applied to the inverting input through the resistors.

7 Claims, 4 Drawing Figures

INTEGRATING CIRCUIT

BACKGROUND OF THE INVENTION

The present invention relates to an integrating circuit which may be advantageously incorporated into an automatic exposure system for a camera.

In order to relieve photographers of the mundane task of setting the exposure dials on their cameras, automatic exposure systems have been developed. Such systems generally comprise a photosensor which produces an output voltage corresponding to the brightness of the scene being photographed. The camera shutter is opened at the instant the photosensor is energized. The output of the photosensor is integrated and the shutter closed when the integrated value reaches a predetermined level. This type of system may also be applied to electronic flash units for regulating the flash duration as a function of reflected light.

Since the output voltage of commercially available photosensors varies over a very wide rnage in accordance with incident light, it is desired to logarithmically compress the rangge of variation. Typical circuits for accomplishing this function generally comprise transistors and diodes which are very sensitive to temperature variations. Complex and relatively expensive circuitry is necessary for temperature stabilization of such circuits.

SUMMARY OF THE INVENTION

The present invention overcomes the drawbacks of the prior art by providing a novel and unique integrating circuit which comprises only an operational amplifier, resistors and capacitors which are relatively insensitive to temperature variations. A plurality of resistors are connected in series to an input of the operational amplifier. An integrating capacitor is connected between the output and the input of the operational amplifier. A plurality of capacitors are connected between the input and the junctions of the resistors respectively. The time required for the output voltage of the operational amplifier to reach a predetermined level is an exponential function of an input voltage applied to the operational amplifier through the resistors.

It is an object of the present invention to provide an integrating circuit which produces an output voltage as an exponential function of an input voltage.

It is another object of the present invention to provide an integrating circuit which has superior temperature stability over the prior art.

It is another object of the present invention to provide an integrating circuit comprising simpler and less expensive electronic circuitry than the prior art.

It is another object of the present invention to provide a generally improved integrating circuit.

Other objects, together with the foregoing, are attained in the embodiment described in the following description and illustrated in the accompanying drawing.

DESCRIPTION OF THE PREFERRED EMBODIMENT

While the integrating circuit of the invention is susceptible of numerous physical embodiments, depending upon the environment and requirements of use, substantial numbers of the herein shown and described embodiments have been made, tested and used, and all have performed in an eminently satisfactory manner.

Figure 1:
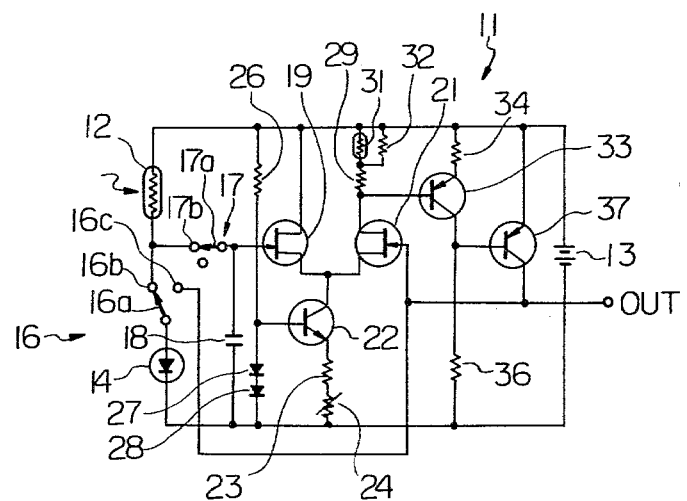
FIG. 1 is an electrical schematic diagram of a prior art electronic integrating circuit.

Referring now to the drawing, a prior art integrating circuit 11 is shown in FIG. 1 and comprises a photoresistor 12, the resistance of which varies in accordance with incident light. One end of the photoresistor 12 is connected to a positive terminal of a battery 13, a negative terminal of which is connected to the cathode of a diode 14. A movable contact 16a of a switch 16 is connected to the anode of the diode 14. A fixed contact 16b of the switch 16 is connected to the photoresistor 12 and also to a fixed contact 17b of a switch 17. A movable contact 17a of the switch 17 is connected to the negative terminal of the battery 13 through a capacitor 18 and also to the gate of an N-channel FET 19. The drain of the FET 19 is connected to the positive terminal of the battery 13. The source of the FET 19 is connected to the source of another N-channel FET 21 and also to the collector of an NPN bipolar transistor 22. The emitter of the transistor 22 is connected to the negative terminal of the battery 13 through a fixed resistor 23 and a variable resistor 24 which are connected in series. The gate of the FET 21 is connected to a fixed contact 16c of the switch 16. A resistor 26 is connected in series with diodes 27 and 28 across the battery 13, with the junction of the resistor 26 and anode of the diode 27 connected to the base of the transistor 22.

The drain of the FET 21 is connected through a fixed resistor 29 and a thermistor 31 in series to the positive terminal of the battery 13. A fixed resistor 32 is connected across the thermistor 31.

The drain of the FET 21 is also connected to the base of a PNP transistor 33, the emitter of which is connected to the positive terminal of the battery 13 through a resistor 34. The collector of the transistor 33 is connected to the negative terminal of the battery 13 through a resistor 36. The collector of the transistor 33 is further connected to the base of a PNP transistor 37, the emitter of which is connected to the positive terminal of the battery 13. The collector of the transistor 37 is connected to the gate of the FET 21 and constitutes an output terminal.

In operation, the movable contacts 16a and 17a, which are ganged together, are moved into engagement with the fixed contact 16b and the fixed contact 17b respectively. This connects the junction of the photoresistor 12 and diode 14 to the gate of the FET 19. The FET 19 and the FET 21 are connected as a differential amplifier. The transistor 33 serves to invert the output of the FET 21 and the transistor 37 serves as an amplifier stage.

The resistance and current flow through the photoresistor 12 vary in accordance with incident light. This same current flows through the diode 14 so that the voltage drop thereacross varies. In accordance with the basic properties of PN junctions, the voltage across the diode 14 is proportional to the logarithm of the current flow therethrough. The voltage across the diode 14 causes the capacitor 18 to charge and thereby integrate the instantaneous voltage across the diode 14. When the movable contacts 16a and 17a are changed over, the capacitor 18 is disconnected from the diode 14 and holds its charge. The voltage across the capacitor 18 is amplified by the differential amplifier and appears at the collector of the transistor 37.

Since the diode 14, FET 19, FET 21 and transistors 33 and 37 have characteristics which vary considerably in accordance with ambient temperature, the thermistor 31 is provided to improve the temperature stability. The transistor 22 functions as a constant current source for the FET 19 and FET 21, and the resistor 26 in combination with the diodes 27 and 28 serve to improve the temperature stability of the transistor 22. It will be seen that the circuitry shown in FIG. 1 is quite complicated, and cannot operate with very high stability against changes in temperature since the various components are mounted in different places on a circuit board (not shown) at which the temperature is not uniform.

Figure 2:
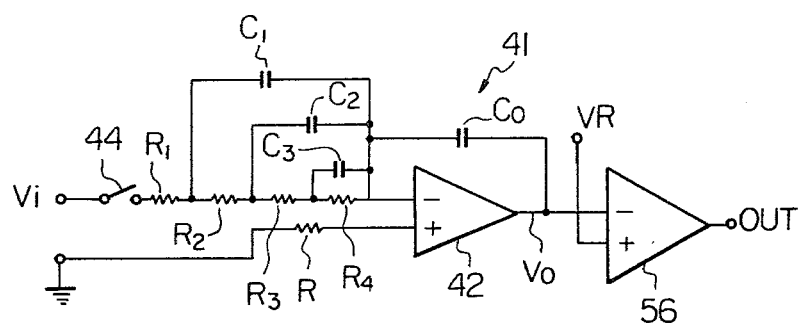
FIG. 2 is an electrical schematic diagram of an electronic integrating circuit embodying the present invention.

This problem is completely overcome in an integrating circuit 41 embodying the present invention which is shown in FIG. 2. The circuit 41 comprises an operational amplifier 42. An integrating capacitor C0 is connected between the output and inverting input of the operational amplifier 42. An input voltage from a photosensor or the like (not shown) is applied to the inverting input of the operational amplifier 42 through a switch 44 and resistors R1, R2, R3 and R4 which are connected in series. A capacitor C1 is connected between the junction of the resistors R1 and R2 and the inverting input of the operational amplifier 42. A capacitor C2 is connected between the junction of the resistors R2 and R3 and the inverting input of the operational amplifier 42. A capacitor C3 is connected between the junction of the resistors R3 and R4 and the inverting input of the operational amplifier 42. The non-inverting input of the operational amplifier 42 is connected to ground through a resistor R. The output of the operational amplifier 42 is connected to the inverting input of an operational amplifier 56 which functions as a voltage comparator. A reference voltage VR is applied to the non-inverting input of the operational amplifier 56.

In operation, a negative input voltage Vi is applied to the switch 44 from a photosensor or the like (not shown). With the switch 44 open (initial condition), the output voltage V0 of the operational amplifier 42 is zero and the output voltage of operational amplifier 56 is maximum. To begin integration, the switch 44 is closed and the input voltage Vi applied to the inverting input of the operational amplifier 42 through the resistors R1, R2, R3 and R4. Since the feedback current of the operational amplifier 42 is at all times equal to the input current, the capacitor C0 begins to charge linearly. The output voltage V0 begins to rise at a rate which is linearly proportional to the input current of the operational amplifier 42 and therefore linearly proportional to the voltage at the inverting input of the operational amplifier 42. In this manner, the output voltage V0 increases as the integral with respect to time of the voltage at the inverting input of the operational amplifier 42.

Figure 3:
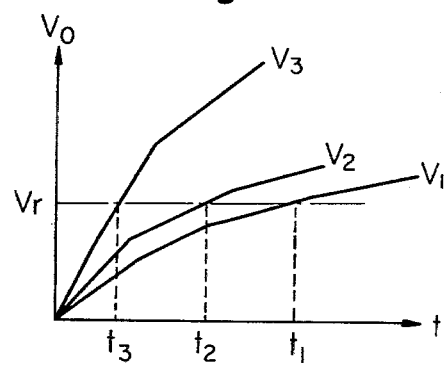
FIGS. 3 and 4 are graphs illustrating the operation of the present integrating circuit.

However, due to the provision of the resistors R1, R2, R3 and R4 and the capacitors C1, C2 and C3, the output voltage V0 is not the integral with respect to time of the input voltage Vi. Assuming a simplified case in which the capacitors C1, C2 and C3 have the same value, the capacitor C1 will charge faster than the capacitor C2 which will in turn charge faster than the capacitor C3. The reason for this is that the charging path for the capacitor C1 comprises less resistance than the charging paths for the capacitors C2 and C3. Thus, the input current of the operational amplifier 42 is maximum at the start of integration since the capacitors C1, C2 and C3 are initially discharged and the current flow therethrough, which also flows through the inverting input of the operational amplifier 42, is maximum. The current flow through the capacitors C1, C2 and C3 decreases exponentially as the capacitors charge exponentially. The capacitor C1 will approach full charge first, followed by the capacitors C2 and C3, such that for a constant input voltage Vi the current flow through the inverting input of the operational amplifier 42 will be initially maximum and decrease with time in a generally discontinuous manner. FIG. 3 shows the output voltage V0 for constant values V1, V2 and V3 of the input voltage Vi. It will be seen that the output voltage V0 increases at the highest rate with the highest applied input voltage V3. The times at which the output voltage V0 equals the reference voltage VR are t1, t2 and t3 respectively. As the output voltage V0 exceeds the reference voltage VR, the output voltage of the operational amplifier 56 goes to the minimum value. It will be seen that for the highest applied voltage V3, the time t3 required for the output voltage V0 to reach the reference voltage VR is the shortest. Where the circuit 41 is used in the automatic exposure system of a camera, the maximum output voltage of the operational amplifier 56 will open the camera shutter (not shown) and the minimum output voltage of the operational amplifier 56 will close the camera shutter after the integrated value of the input voltage Vi reaches the reference value VR.

Figure 4:
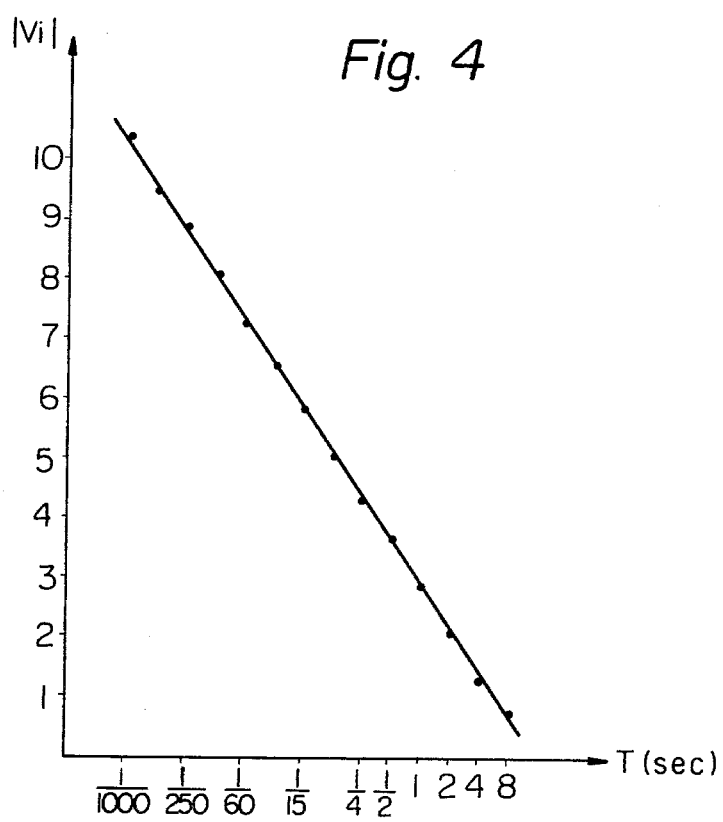

The time t0 for the output voltage V0 to reach the reference voltage VR as a function of the input voltage Vi is shown in FIG. 4 for the case in which the circuit elements have the following values:

| | |
|---|---|
| R = 500KΩ, | R1 = 330Ω |
| R2 = 21.08KΩ, | R3 = 130KΩ |
| R4 = 548.59KΩ, | C1 = 1μF |
| C2 = 0.47μF, | C3 = 1μF |
| C0 = 1μF | |

In this example, the time t0 as a function of input voltage Vi is:

$$t0 \simeq 15.07 l^{(-0.93 Vi)}$$

where l is the base of natural logarithms.

With the input voltage Vi increased by about four times from $-2.04$ V to $-8.05$ V, the time t0 is reduced by about 250 times from about 2 seconds to about 1/125 seconds.

Any exponential function of the form $t0 = Z1 l^{(-Z2 Vi)}$ where Z1 and Z2 are the desired constants may be provided through selection of the values of the resistors R1, R2, R3 and R4 and capacitors C1, C2 and C3 in the following manner, where $R1+R2+R3+R4=R0$, $(R2+R3+R4)/R0=a$, $(R3+R4)/R0=b$, $R4/R0=d$, and i1, i2, i3 and i4 are the instantaneous values of current flow through the capacitors C1, C2, C3 and C4 respectively.

$$1/C1 = \int i1 \, dt = R0\{(a-b)i2 + (a-d)i3 + a \cdot i4\} \quad (1)$$

$$1/C2 = \int i2 \, dt = R0 \{(b-d)i3 + b \cdot i4\} \quad (2)$$

$$1/C3 = \int i3\, dt = d.R0.i4 \quad (3)$$

$$Vi = R0\{(1-a)i1 + (1-b)i2 + (1-d)i3 + i4\} \quad (4)$$

$$V0 = 1/C\int(i1+i2+i3+i4)\, dt$$

The following relation is produced from equations (1), (2), (3) and (4) through Laplace transformation:

$$Vi = (1-a)$$
$$T.K/AAt + BB + CCl^{X1t} + DDl^{X2t} + EEl^{X3t}$$

where T is the time constant and K is a constant, X1, X2 and X3 are the roots of the cubic equation $X^3 + BX^2 + CX + D = 0$ and $$B = K1,\ C = K2,\ D = G/1-a$$

$$E = G\{(a-b)b.T1.T2 + (b-d)d.T2.T1 + (a-d)d.T1.T3\}$$

$$F = G(aT1 + bT2 + dT3)$$

$$G = 1/(a-b)(b-d)d.T1.T2.T3$$

$$K1 = \frac{(1-b)}{(1-a)(a-b)} \cdot \frac{1}{T1} + \frac{a-d}{(a-b)(b-a)} \cdot \frac{1}{T2} + \frac{b}{(b-d)d} \cdot \frac{1}{T3}$$

$$K2 = \frac{(1-d)d \cdot T3 + (1-b)b \cdot T2 + (1-a)a \cdot T1}{(1-a)(a-b)(b-d)d \cdot T1 \cdot T2 \cdot T3}$$

$$T1 = C1R0,\ t2 = C2R0,\ T3 = C3R0$$

$$AA = -\frac{G}{X1 \cdot X2 \cdot X3}$$

$$BB = -\frac{F \cdot X1 \cdot X2 \cdot X3 + G(X1 \cdot X2 + X2 \cdot X3 + X3 \cdot X1)}{X1^2 \cdot X2^2 \cdot X3^2}$$

$$CC = \frac{X1^3 + EX1^2 + FX1 + G}{X1^2(X1 - X2)(X1 - X3)}$$

$$DD = \frac{X2^3 + EX2^2 + FX2 + G}{X2^2(X2 - X1)(X2 - X3)}$$

$$EE = \frac{X3^3 + EX3^2 + FX3 + G}{X3^2(X3 - X1)(X3 - X2)}$$

In summary, it will be seen that the present integrating circuit is much simpler in configuration and less expensive to manufacture on a commercial production basis than prior art integrating circuits. It is much more stable over a wide range of ambient temperature since it comprises only operational amplifiers, resistors and capacitors which are much more stable than the transistors and diodes used in the prior art. Where installed in the automatic exposure system of a camera, it will allow the camera to produce perfect exposure under the most severe temperature conditions. Various modification will become possible for those skilled in the art after receiving the teachings of the present disclosure without departing from the scope thereof. For example, the input voltage Vi may be applied to the inverting input of the operational amplifier 42 through more than three resistors connected in series, for example five resistors. In this case, four capacitors would be connected between the inverting input of the operational amplifier 42 and the junctions of the resistors respectively. The greater the number of such components, the more the segments of the output voltage curve and the smoother the curve.

What is claimed is:

1. An integrating circuit comprising:
    an operational amplifier having a first input and an output;
    an integrating capacitor connected between the first input and the output;
    a plurality of resistors connected in series to the first input; and
    a plurality of capacitors connected between the first input and junctions of the resistors respectively.

2. A circuit as in claim 1, in which the operational amplifier has a second input which is connected to ground.

3. A circuit as in claim 1, in which the first input is an inverting input.

4. A circuit as in claim 2, in which the first input is an inverting input and the second input is a non-inverting input.

5. A circuit as in claim 2, further comprising a resistor connected between the second input and ground.

6. A circuit as in claim 1, in which the values of the resistors and capacitors are selected in such a manner that a time required for a voltage at the output to reach a predetermined level is an exponential function of a voltage applied to the first input through the plurality of resistors.

7. A circuit as in claim 1, further comprising a voltage comparator having a first input connected to the output of the operational amplifier and a second input to which is applied a reference voltage.

* * * * *